OPTICAL SYSTEM HAVING CYLINDRICAL ROD-LIKE LENSES
Filed July 14, 1960 4 Sheets-Sheet 1
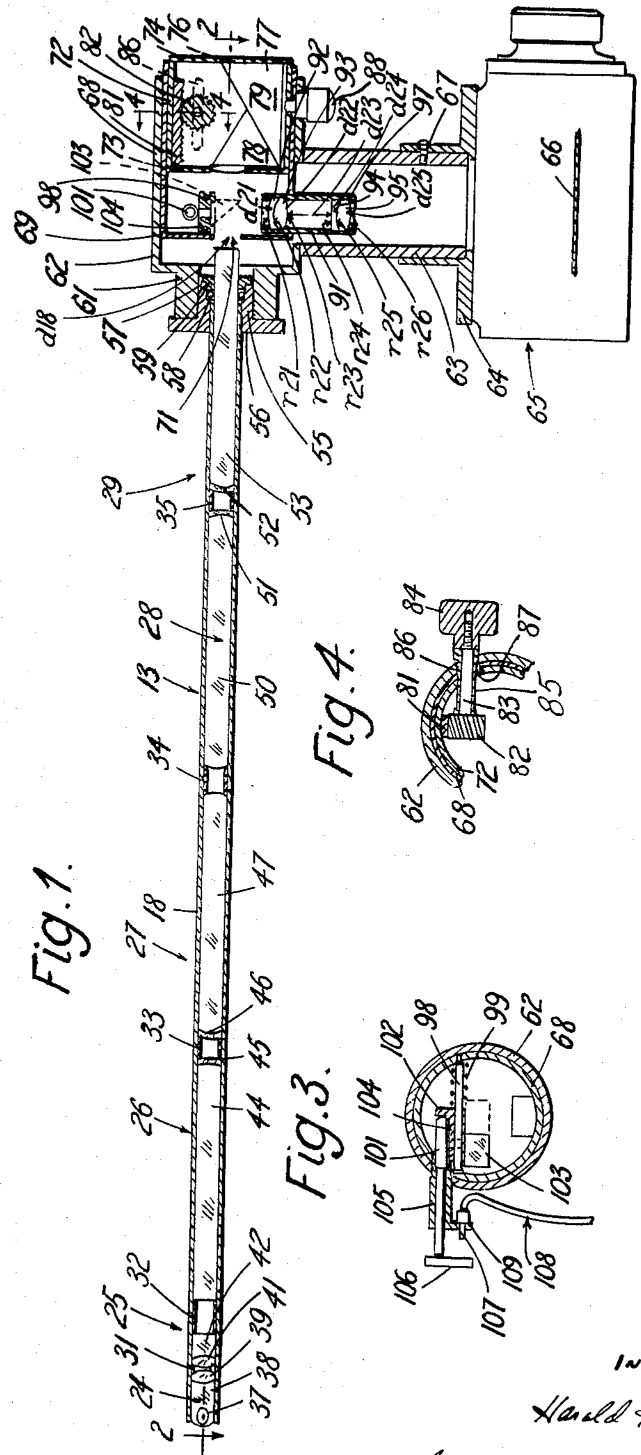
INVENTOR
Harold Horace Hopkins
BY Watson, Cole, Grindle & Watson
ATTORNEYS

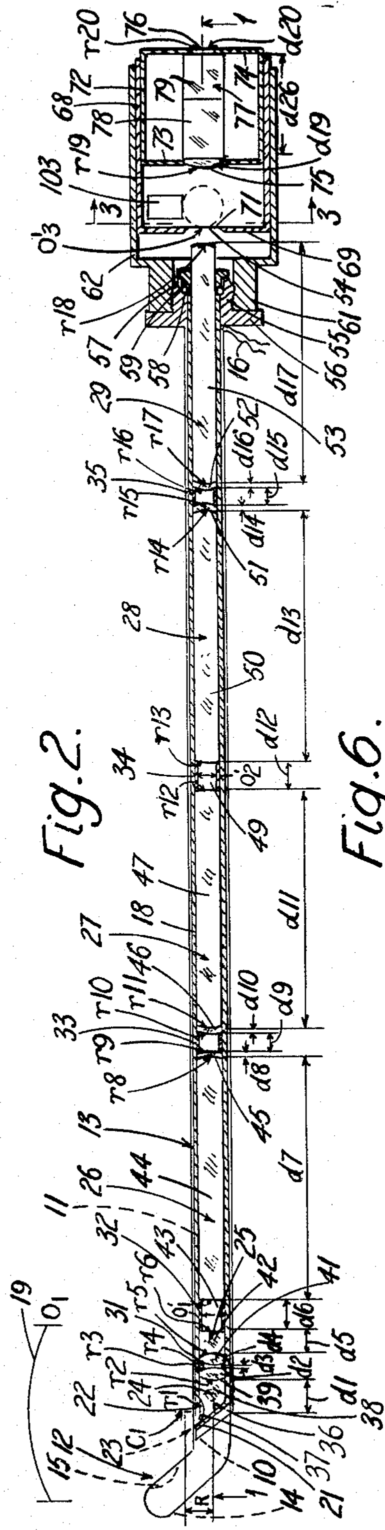
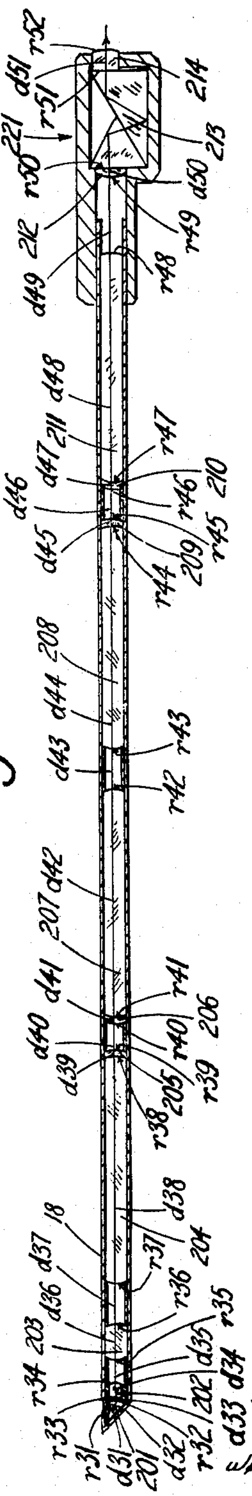
INVENTOR
Harold Horace Hopkins
by
Watson, Cole, Grindle & Watson
ATTORNEYS

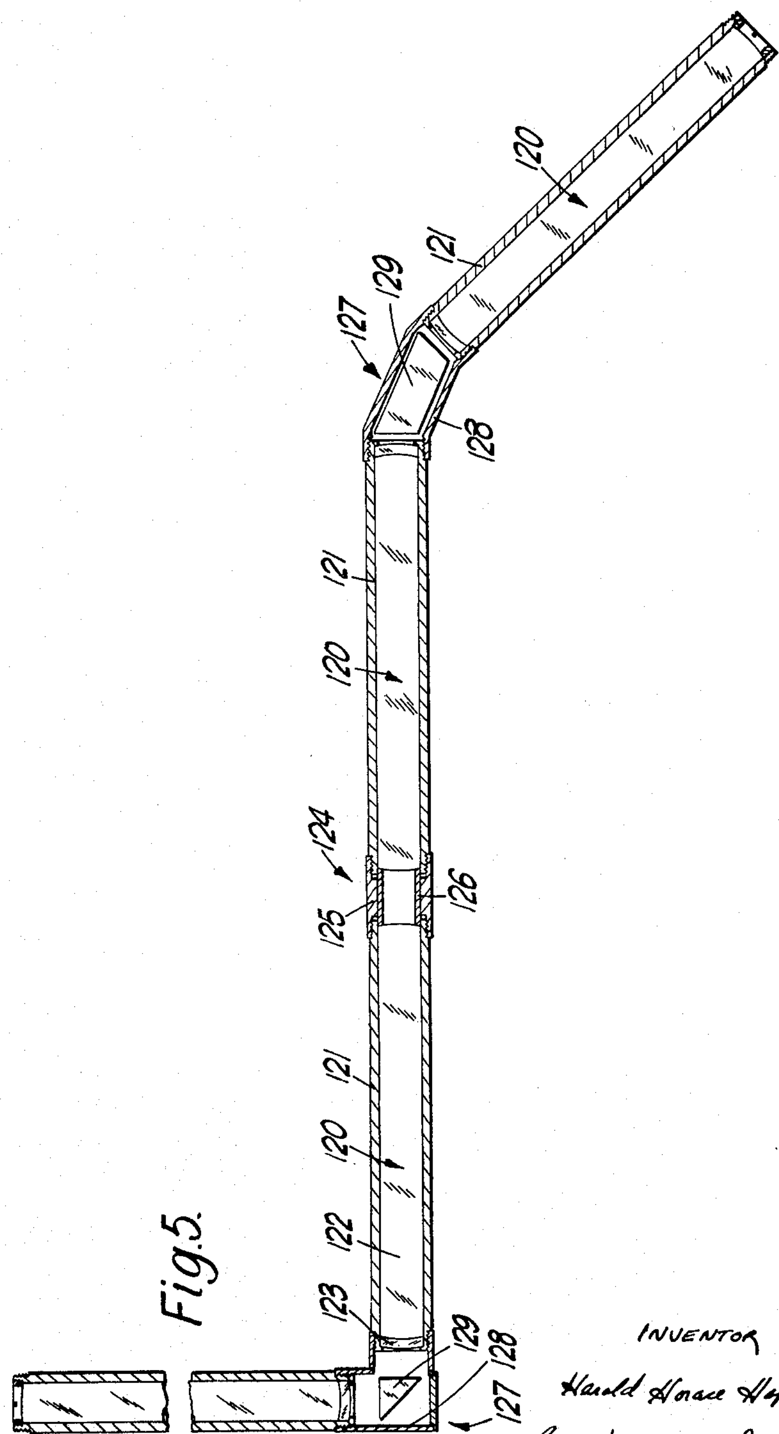
INVENTOR
Harold Horace Hopkins
By Watson, Cole, Grindle & Watson
ATTORNEYS OPTICAL SYSTEM HAVING CYLINDRICAL ROD-LIKE LENSES
Filed July 14, 1960
4 Sheets-Sheet 4
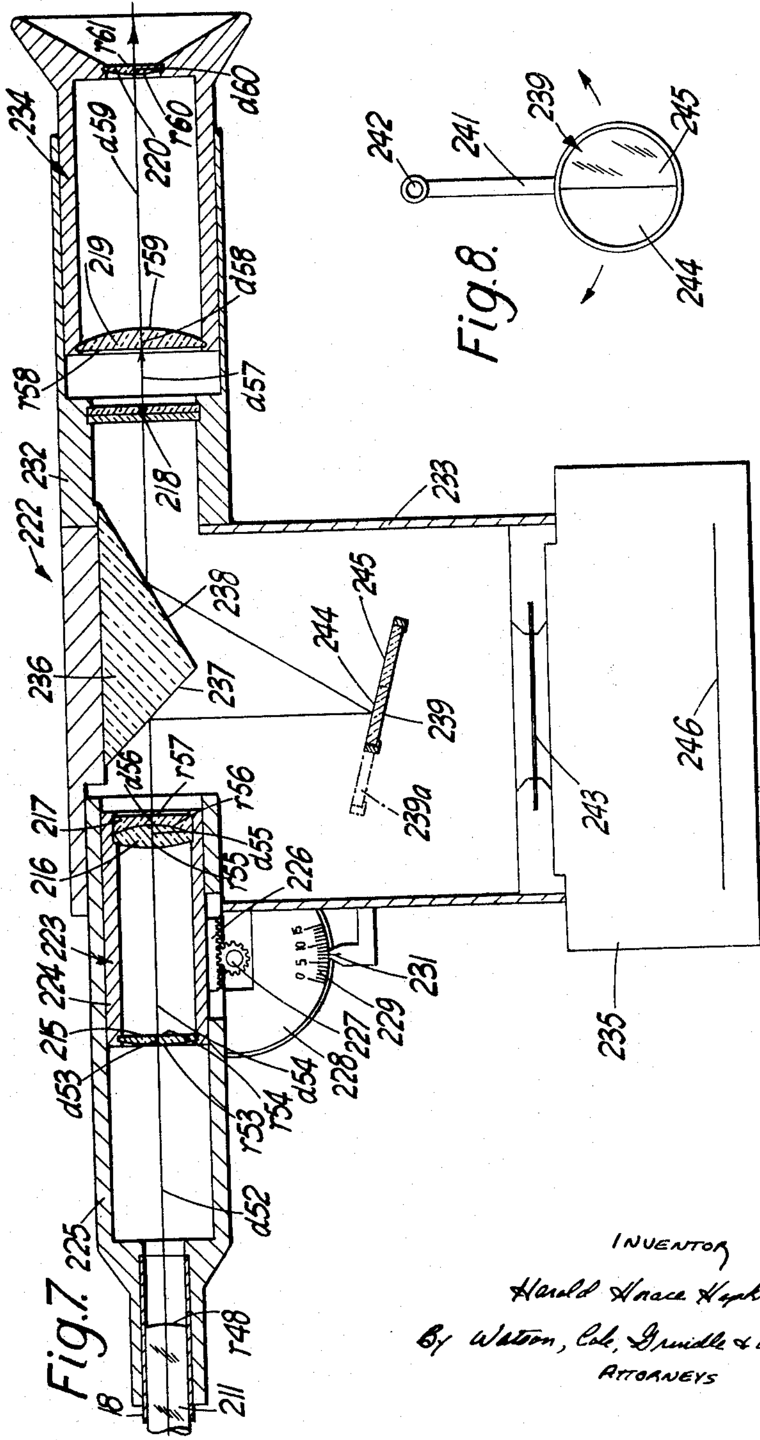
INVENTOR
Harold Horace Hopkins
By Watson, Cole, Grindle & Watson
ATTORNEYS United States Patent Office 3,257,902 Patented June 28, 1966

1

3,257,902
OPTICAL SYSTEM HAVING CYLINDRICAL ROD-LIKE LENSES

Harold Horace Hopkins, Barnet, England, assignor to W. Watson & Sons Limited, Barnet, England, a British company Filed July 14, 1960, Ser. No. 42,832
Claims priority, application Great Britain, July 16, 1959, 24,539/59
7 Claims. (Cl. 88—57)

The invention relates to optical systems and is more particularly concerned with optical systems for conveying and/or forming optical images, e.g. endoscopes.

The invention provides an optical system for conveying and/or forming an optical image, which system comprises at least two rod-like lenses arranged end to end in separated relationship, the refractive index of the rod-like lenses being greater than that of the medium separating them, and the axial length of each of the said rod-like lenses being greater than the axial length of the said medium.

Preferably the said lenses are contained within a tube and their peripheries cooperate with the interior of the tube to centre the axes of the said lenses in relation to one another. Preferably an annular spacer is provided between the said two lenses within the tube, which spacer surrounds the said medium between the said lenses and determines the axial length of that medium.

Preferably the major part of the length of the optical path through the system is provided by the said lenses.

Examples of constructions embodying the invention will now be described by way of example and with reference to the accompanying drawings in which:

FIGURE 1 shows a sectional elevation of a cystoscope, on the line 1—1 of FIGURE 2, the sheath and illuminating means being omitted in this view, FIGURE 2 shows a section on the line 2—2 of FIGURE 1, FIGURE 3 shows a section on the line 3—3 of FIGURE 2, FIGURE 4 shows a section on the line 4—4 of FIGURE 1, FIGURE 5 shows a sectional elevation of an alternative construction, FIGURE 6 shows a sectional elevation of a telescope for a cystoscope which is a modification of that shown in FIGURES 1 and 2 and is intended only for direct viewing, FIGURE 7 shows a sectional view of a modification of the construction shown in FIGURE 6 to adapt it for taking photographs through the telescope, and FIGURE 8 shows a detail of the construction of FIGURE 7.

In the example shown in FIGURES 1 to 4 the optical system is embodied in an endoscope intended for use as a cystoscope. This instrument has a tubular sheath 11 for insertion into a cavity of the body, particularly the bladder, and means 12 at one end of the sheath 11 for illuminating an internal wall 19 of the cavity. The means 12 consists of an extension 14 of the sheath 11, at an oblique angle thereto, which extension is sealed at its end and divided internally from the sheath 11 by a separating wall 10. In the hollow chamber so-formed there is mounted an electric lamp 15 for illuminating the cavity wall 19, which lamp 15 is supplied by wires 16 led to the extension 14 through a small passage formed in the wall of the sheath 11.

The end of the sheath 11 furthest from the extension 14 is left open and through this the telescope 13 is inserted into the sheath. The telescope 13 has a hollow cylindrical casing 18 sealed at one end by an oblique plate 21 and having an aperture 22 which is aligned with an aperture 23 in the sheath 11 so that both apertures face on to the part of the cavity wall 19 illuminated by the means 12.

The casing 18 contains an optical system comprising rod-like glass lenses 24, 25, 26, 27, 28 and 29 which are spaced by annular spacers 31, 32, 33, 34 and 35. The outside edges of the rod-like lenses are left smooth ground and made non-reflecting by coating them with an optically black paint; this coating serves to minimise reflection of light from the inside walls of the casing 18. The rod-like lenses and the spacers have a sliding fit with the casing 18, the lenses having a greater axial length than the spacers. Thus the optical system is easily assembled by inserting the rod-like lenses and the spacers in proper order and the lenses are automatically accurately centered on the optical axis, squared thereon and spaced.

The rod-like lenses 24 and 25, spaced by the spacer 31, form the objective system of the telescope 13. The lens 24 is formed of two glass components 38 and 39, the component 39 being a correcting component cemented to one end of the component 38. The opposite end of the component 38 is formed with a silvered prismatic face 36 which abuts the plate 21, a part-spherical surface 37 is formed in the peripheral surface of the component 38 which faces radially outwards through the apertures 22 and 23. The lens 25 is also formed of two components 41 and 42, the component 41 being a correcting component cemented on to one end of the component 42, the other end of which is formed with a part-spherical surface. The two lenses 24 and 25 are assembled in end to end relationship with their correcting components 39 and 41 separated by the spacer 31. This objective system of the telescope 13 forms at 43 an image of the internal cavity wall 19.

This image is conveyed down the telescope 13 by the first copying system comprising the rod-like lenses 26 and 27 and the spacer 33. This copying system is spaced from the objective system by means of the spacer 32. The lens 26 is formed of two components 44 and 45, the component 45 being a correcting component cemented on to the component 44, and similarly the lens 27 is formed of two components 46 and 47, of which the component 46 is a correcting component cemented onto the component 47. The rod-like lenses 26 and 27 are assembled in end to end relationship with their correcting components spaced by the spacer 33. This first copying system forms at 49 a second image of the cavity wall 19.

An identical second copying system comprises rod-like lenses 28 and 29 and a spacer 35, this second copying system is separated from the first by a spacer 34. The lenses 28 and 29 are similarly formed of components 50 and 53 and correcting components 51 and 52, and are assembled in end to end relationship with their correcting components 51 and 52 spaced by the spacer 35. This second copying system forms at 54 a further image of the cavity wall 19.

The open end of the telescope casing 18 has a sleeve 55 secured thereto, which sleeve has a radial flange 56 and an axial flange 57 spaced away from the rod-like lens 29 to form a socket for a sealing ring 58. This sealing ring 58 surrounds the lens 29 and abuts the end of the casing 18. The flange 57 is internally threaded to receive a screwed cap 59 which secures the sealing ring 58. The cap 59 is bored to receive the end of the rod-like lens 29. The sleeve 55 is threaded externally to receive the internally threaded neck 61 of a cylindrical casing 62. A cylindrical member 63 extends radially downwards from the casing 62, which member is adapted to be secured to a bracket 64 which is in turn secured to a camera 65 having a film 66; the member 63 is secured to the bracket 64 by means of screws 67.

The casing 62 is open at its end furthest from the telescope 13 and has slidably mounted within it a cylindrical member 68. This member 68 has a masking shield 69 at one end which has an aperture 71. A cross-wire or other focussing aid is mounted in the aperture 71. The other end of the member 68 is open and receives a cylindrical eyepiece casing 72, slidably mounted within the member 68. This eyepiece casing 72 is closed by plates 73 and 74 which have apertures adapted to receive the components 75 and 76 of an eyepiece 77. The eyepiece 77 comprises two prismatic components 78 and 79 cemented together having components 75 and 76 respectively mounted thereon. A rack 81 is mounted on the inner surface of the eyepiece casing 72 and meshes a pinion 82. This pinion is mounted on a spindle 83 and can be rotated by turning a knob 84 mounted at its other end. The spindle 83 is rotatably mounted in an externally threaded sleeve 85 which is screwed into a threaded bore in the casing 62. The spindle is free to move in a slot 86 in the member 68 and passes through an aperture 87 in the eyepiece casing 72. The eyepiece casing 72 can be locked to the member 68 by means of a knurled screw 88. When the eyepiece casing 72 is not so locked, rotation of the pinion 82 causes the eyepiece casing to slide within the member 68 and the eyepiece may thus be adjusted to focus on a cross hair in the aperture 71. When the eyepiece is focussed on to the cross hair, the eyepiece casing is locked to the member 68 and further rotation of the pinion serves to slide the member 68, together with the eyepiece casing 72, within the casing 62 and thus to focus the eyepiece on to the image at 69 by bringing the aperture 71 into the same plane as the image at 69.

A radially extending cylindrical sleeve 91 is mounted in the member 68 so that it is directed downwards along the cylindrical member 63 towards the film 66 in the camera 65. This sleeve has internal shoulders on which are seated the components 92, 93, 94 and 95 of the camera objective optical system, which components are retained by rings 96 and 97.

Two rods 98 are mounted horizontally in the member 68 so that they extend across that member vertically above the sleeve 91 (see FIGURE 3). A reflector 103 is secured to a bracket 104 which is slidably mounted on the rods 98; the bracket 104 is adapted to be slid along the rods 98 against the action of springs 99 by the action of the spindle 101 which abuts a projection 102 on bracket 104. The spindle 101 is slidably mounted within a sleeve 105 having an external thread by means of which it is screwed into an internally threaded bore in the casing 62. The spindle 101 passes through a slot in the member 68. On the outer end of the spindle 101 there is secured a knob 106 by means of which the spindle 101 and the bracket 104 can be slid across the rods 98 against the action of the springs 99 until the reflector 103 lies on the optical axis of the telescope 13 and causes an image of the cavity wall 19 to be focussed by means of the camera objective optical system on to the film 66 in the camera 65. The knob 106 is so shaped that, when the reflector 103 is on the optical axis of the telescope 13, a further movement of the knob in contact with the internal cable 107 of a Bowden wire camera shutter release 108 causes the shutter of the camera to be released. The shutter release 108 is mounted in a bracket 109 formed on the sleeve 105.

The radii, axial thicknesses, refractive indexes and dispersions of the components, and the axial thicknesses of the air spaces, of the cystoscope of FIGURES 1–4 are as indicated in the following table, the radii $r_1$ to $r_{26}$ and the thicknesses $d_1$ to $d_{26}$ being indicated on FIGURES 1 and 2. The objective system of this cystoscope is designed for use with an object located in water. In the tables of this specification the linear dimensions are all expressed in millimetres.

| Component | Surface radius | Axial Thickness | Refractive index | Dispersion |
|---|---|---|---|---|
| | $r_1=-4.129$ | | | |
| 38 | | $d_1=7.100$ | 1.60545 | 38.0 |
| | $r_2=+3.930$ | | | |
| | | ($C_1$=Centre of curvature of $r_1$; R=6.100) | | |
| | $r_2=+3.930$ | | | |
| 39 | | $d_2=2.944$ | 1.51690 | 60.6 |
| | $r_3=-5.214$ | | | |
| Air | | $d_3=0.376$ | | |
| | $r_4=+5.214$ | | | |
| 41 | | $d_4=2.944$ | 1.51690 | 60.6 |
| | $r_5=-3.930$ | | | |
| | $r_5=-3.930$ | | | |
| 42 | | $d_5=5.350$ | 1.60545 | 38.0 |
| | $r_6=-64.193$ | | | |
| Air | | $d_6=6.640$ | | |
| | $r_7=+21.358$ | | | |
| 44 | | $d_7=54.157$ | 1.5726 | 57.8 |
| | $r_8=-10.000$ | | | |
| 45 | | $d_8=1.000$ | 1.62558 | 35.7 |
| | $r_8=-10.000$ | | | |
| | $r_9=-20.060$ | | | |
| Air | | $d_9=4.076$ | | |
| | $r_{10}=+20.060$ | | | |
| 46 | | $d_{10}=1.000$ | 1.62558 | 35.7 |
| | $r_{11}=+10.000$ | | | |
| | $r_{11}=+10.000$ | | | |
| 47 | | $d_{11}=54.157$ | 1.5726 | 57.8 |
| | $r_{12}=-21.358$ | | | |
| Air | | $d_{12}=6.640$ | | |
| | $r_{13}=+21.358$ | | | |
| 50 | | $d_{13}=54.157$ | 1.5726 | 57.8 |
| | $r_{14}=-10.000$ | | | |
| | $r_{14}=-10.000$ | | | |
| 51 | | $d_{14}=1.000$ | 1.62558 | 35.7 |
| | $r_{15}=-20.060$ | | | |
| Air | | $d_{15}=4.076$ | | |
| | $r_{16}=+20.060$ | | | |
| 52 | | $d_{16}=1.000$ | 1.62558 | 35.7 |
| | $r_{17}=+10.000$ | | | |
| | $r_{17}=+10.000$ | | | |
| 53 | | $d_{17}=54.157$ | 1.5726 | 57.8 |
| | $r_{18}=-21.358$ | | | |
| 75 | $r_{19}=+17.647$ | $d_{19}=1.000$ | 1.51889 | 60.42 |
| 76 | $r_{20}=-30.907$ | $d_{20}=1.000$ | 1.51889 | 60.42 |
| 77 | | $d_{26}=36.83$ | 1.62049 | 36.2 |
| | $r_{21}=+18.499$ | | | |
| 92 | | $d_{21}=1.000$ | 1.62274 | 39.6 |
| | $r_{22}=+5.432$ | | | |
| | $r_{22}=+5.432$ | | | |
| 93 | | $d_{22}=3.000$ | 1.51507 | 56.4 |
| | $r_{23}=-18.501$ | | | |
| Air | | $d_{23}=9.998$ | | |
| | $r_{24}=+79.030$ | | | |
| 94 | | $d_{24}=1.000$ | 1.62274 | 39.6 |
| | $r_{25}=+7.551$ | | | |
| | $r_{25}=+7.551$ | | | |
| 95 | | $d_{25}=3.000$ | 1.51690 | 60.6 |
| | $r_{26}=-11.794$ | | | |

Owing to the use of rod-like lenses the major part of the length of the optical path through the system is provided by the said lenses and the divergence of the rays in the said lenses is less than would occur in the air gaps in a conventional lens system. For this reason a copying system using rod-like lenses will form an image further down a tube from the initial image. Thus fewer copying systems are necessary and fewer air/glass surfaces; optical corrections for image curvature and astigmatism are therefore possible to a higher degree. Since the adjacent air/glass surfaces are convex to each other, any reflected light is strongly diverged with the result that only a very small proportion of reflected light passes through the system to cause "ghost" images.

This system provides limited flexibility in an endoscope, if the casing 18 is made of flexible material bending can occur at the air-gaps in the telescopes and these gaps then become equivalent to air prisms. These air prisms tend to deviate the optical axis of the optical system in the same direction as the bending of the mechanical axis.

FIGURE 5 shows an alternative construction embodying the invention. In this example an optical system is assembled using units each comprising a rod-like lens 120 mounted in a tubular casing 121. The rod-like lens is formed of two components 122 and 123, the component 123 being a correcting component cemented on to one end of the component 122. The casings 121 of the units are threaded externally at each end and are jointed in end to end relationship by means of connecting members 124 which comprise sleeves 125, internally threaded at each end, containing annular spacers 126 which serve to maintain the rod-like lenses in accurately spaced relationship. If it is required to assemble a non-linear endoscope, connecting members 127 may be used which comprise sleeves 128, internally threaded at each end, containing prisms 129. The prisms 129 are so shaped as to deviate the optical path through any required angle and the sleeves 128 are so shaped as to connect the adjacent units in the corresponding required angular relationship.

In the modified constructions shown in FIGURES 6 and 7, the radii, axial thicknesses, refractive indexes and dispersions of the components, and the axial thicknesses of the air spaces, of the cystoscope are as indicated in the following tables:

| Component | Surface radius | Axial Thickness | Refractive index | Dispersion |
|---|---|---|---|---|
| 201 | $r_{31}=4.5866$<br>$r_{32}=\text{infinity}$ | $d_{31}+d_{32}=3.597$ | 1.62576 | 35.7 |
| Air | | $d_{33}=0.55$ | | |
| 202 | $r_{33}=-2.1909$<br>$r_{34}=-2.4341$ | $d_{34}=3.305$ | 1.52400 | 58.6 |
| Air | | $d_{35}=6.022$ | | |
| 203 | $r_{35}=+8.98$<br>$r_{36}=-12.161$ | $d_{36}=8.544$ | 1.52400 | 58.6 |
| Air | | $d_{37}=8.812$ | | |
| 204 | $r_{37}=+19.35$<br>$r_{38}=-6.447$ | $d_{38}=49.923$ | 1.52400 | 58.6 |
| 205 | $r_{38}=-6.447$<br>$r_{39}=-17.00$ | $d_{39}=1.0$ | 1.57860 | 41.1 |
| Air | | $d_{40}=6.553$ | | |
| 206 | $r_{40}=+17.00$<br>$r_{41}=+6.447$ | $d_{41}=1.0$ | 1.57860 | 41.1 |
| 207 | $r_{41}=+6.447$<br>$r_{42}=-19.35$ | $d_{42}=49.923$ | 1.52400 | 58.6 |
| Air | | $d_{43}=9.18$ | | |
| 208 | $r_{43}=+19.35$<br>$r_{44}=-6.447$ | $d_{44}=49.923$ | 1.52400 | 58.6 |
| 209 | $r_{44}=-6.447$<br>$r_{45}=-17.00$ | $d_{45}=1.0$ | 1.57860 | 41.1 |
| Air | | $d_{46}=6.553$ | | |
| 210 | $r_{46}=+17.00$<br>$r_{47}=+6.447$ | $d_{47}=1.0$ | 1.57860 | 41.1 |
| 211 | $r_{47}=+6.447$<br>$r_{48}=-19.35$ | $d_{48}=49.923$ | 1.52400 | 58.6 |
| Air | | $d_{49}=17.834$ | | |
| 212 | $r_{49}=+22.94$<br>$r_{50}=\text{infinity}$ | $d_{50}=1.0$ | 1.70035 | 30.3 |
| 213 | $r_{50}=\text{infinity}$<br>$r_{51}=\text{infinity}$ | Total path through prism 213=26.767 | 1.62576 | 35.7 |
| 214 | $r_{51}=\text{infinity}$<br>$r_{52}=-21.358$ | $d_{51}=4.0$ | 1.50970 | 64.4 |
| Air | | $d_{52}=36.999$ | | |
| 215 | $r_{53}=+22.864$<br>$r_{54}=\text{infinity}$ | $d_{53}=2.0$ | 1.62576 | 35.7 |
| Air | | $d_{54}=25.0$ | | |
| 216 | $r_{55}=+18.4$<br>$r_{56}=-13.10$ | $d_{55}=3.0$ | 1.52400 | 58.6 |
| 217 | $r_{56}=-13.10$<br>$r_{57}=+180.60$ | $d_{56}=1.0$ | 1.70035 | 30.3 |
| Air | | Distance between surface $r_{57}$ and graticule 218 or film plane =99.857 | | |
| Air | | $d_{57}=8.46$ | | |

| Component | Surface radius | Axial Thickness | Refractive index | Dispersion |
|---|---|---|---|---|
| 219 | $r_{58}=\text{infinity}$<br>$r_{59}=-17.841$ | $d_{58}=2.5$ | 1.50970 | 64.4 |
| Air | | $d_{59}=33.71$ | | |
| 220 | $r_{60}=+26.049$<br>$r_{61}=\text{infinity}$ | $d_{60}=1.0$ | 1.50970 | 64.4 |

In the construction shown in FIGURE 6, the endoscope has a prismatic eyepiece 221 comprising lenses 212, 214 and a reflecting prism 213. The path of the central light ray through the system is indicated. The eyepiece is shown for convenience in a position rotated through a right angle about the axis of the telescope from its true position. The optical systems of FIGURES 6 and 7 have slightly better correction of aberrations than that of FIGURES 1 and 2 and in particular provide a flatter image field.

In the construction shown in FIGURE 7, the eyepiece 221 is replaced by a camera and eyepiece assembly 222. That assembly includes a camera lens 223 comprising two lenses 215, and 216, 217 mounted in a tube 224 which is axially slidable within a tube 225 firmly secured to the casing 18. The lens 223 is adjustable axially, for focussing, by means of a rack 226 and pinion 227. The pinion 227 is rotated by means of a knob 228 having a scale 229 cooperating with an index mark 231. The scale 229 may be used to record the magnification thereby permitting measurements to be made of features of, for example, the bladder wall.

The tube 225 is secured to two further tubes 232, 233 which carry respectively a focussing eyepiece 234 having lenses 219, 220, and a 35 mm. camera body 235. The tube 232 carries a reflecting prism 236 having reflecting faces 237, 238. The face 237 reflects the light beam from the telescope on to a glass plate 239 which is carried by an arm 241 pivotally mounted at 242 so that the plate 239 is movable between the position in which it is shown in full lines in FIGURE 7 to the position in which it is shown in broken lines at **239*a* in that figure. The camera shutter is at 243 and its control is linked to the arm 241 so that for the period during which the shutter is open the plate 239 occupies the position 239*a*. The plate 239 is silvered over half of its surface, at 244, to provide a fully reflecting surface. The other half, 245, of the plate 239** is left as clear glass.

Initially the eyepiece 234 is adjusted until the graticule 218 is sharply focussed in it. The camera lens 223 is then adjusted axially until the cavity wall 19 is sharply focussed in the eyepiece, its image then being conjugate with the graticule 218, the light from the telescope being reflected to the eyepiece by the surfaces 237, 244 and 238. The graticule 218 is at the same optical distance from the lens 223 as is the film 246 of the camera, so that when the shutter is operated and the light passes through the clear glass 245 to the film 246, the image of the cavity wall is sharply focussed on to the film 246 instead of on to the graticule 218. A small proportion (about 5 percent) of the light is reflected by the clear glass 245 and this is useful in that it enables a flash to be seen in the eyepiece at the instant that a photograph is taken, if that is achieved by "overvolting" the lamp 15 to provide a momentary high intensity flash of light. The flash thus seen in the eye-piece provides visual confirmation that a photograph has been taken.

The invention is not limited to the details of the foregoing constructions which are given by way of example. For instance the casing 18 of the telescope 13 may be made of flexible material and the objective system may be adapted for use with an object located in a medium other than water.

I claim:

1. An optical system for forming an optical image of an object which optical system comprises a first cylindrical rod-like biconvex lens having a convex entry face and a convex exit face, a second cylindrical rod-like biconvex lens, each lens including a correcting component with different refractive index than the first lens forming therewith a compound lens having a convex entry face and a convex exit face, the lenses having a common optical axis and the entry face of the second lens being separated from the exit face of the first lens by a space which contains a gas, the lenses being arranged symmetrically about the said space, the axial thickness of each lens being substantially greater than the diameter of that lens and greater than the axial thickness of the said space.

2. An optical system for forming an optical image of an object which optical system comprises a first cylindrical rod-like biconvex lens having a convex entry face and a convex exit face, a second cylindrical rod-like biconvex lens having a convex entry face and a convex exit face, the lenses having a common optical axis and the entry face of the second lens being separated from the exit face of the first lens by a space which contains a gas, the lenses being arranged symmetrically about the said space, the axial thickness of each lens being greater than the diameter of the lens and greater than the axial thickness of the said space, the image formed by the system, of an object at an axial distance in front of the entry face of the first lens less than the axial thickness of the first lens, being at an axial distance beyond the exit face of the second lens less than the axial thickness of the second lens.

3. An optical system for forming an optical image of an object which optical system comprises a first cylindrical rod-like biconvex lens having a convex entry face and a convex exit face, a second cylindrical rod-like biconvex lens having a convex entry face and a convex exit face, the lenses having a common optical axis and the entry face of the second lens being separated from the exit face of the first lens by a space which contains a gas, the lenses being arranged symmetrically about the said space, the axial thickness of each lens being greater than the diameter of that lens and greater than the axial thickness of the said space, the image formed by the system, of an object in front of the entry face of the first lens, being beyond the exit face of the second lens and the same size as the said object.

4. In an endoscope, a tubular casing housing an optical system consisting of at least two rod lenses of equal length and whose diameter is such that they make a sliding fit within the casing, the rod lenses being separated by gas filled space, the end of each rod lens which is adjacent said space being convex to a curvature which causes an image, whose diameter is equal to the internal diameter of the tubular casing and which image is received near one outer end of the said optical system from an axial distance which is less than the axial length of each rod lens, to be presented at unit magnification near the other end of the said optical system at an axial distance therefrom which is less than the axial length of each rod lens, wherein the plurality of the cylindrical rod-like lenses are placed end to end with intervening gas spaces wherein the surface radius of each convex surface is selected together with the axial thickness of the lens and the refractive index to provide small divergence of the rays and form an image through said tube with use of few air glass surfaces, and wherein the relationship of lenses is defined in the following table, components 38 to 95, radii $r_1$ to $r_{26}$ and thicknesses $d_1$ to $d_{25}$ being identified on FIGURES 1 and 2,

| Component | Surface Radius | Axial Thickness | Refractive Index | Dispersion |
|---|---|---|---|---|
| 38 | $r_1=-4.129$<br>$r_2=+3.930$ | $d_1=7.100$ (C₁=Center of curvature of $r_1$; R=6.100) | 1.60545 | 38.0 |
| 39 | $r_2=+3.930$<br>$r_3=-5.214$ | $d_2=2.944$ | 1.51690 | 60.6 |
| Air |  | $d_3=0.376$ |  |  |
| 41 | $r_4=+5.214$<br>$r_5=-3.930$ | $d_4=2.944$ | 1.51690 | 60.6 |
| 42 | $r_5=-3.930$<br>$r_6=-64.193$ | $d_5=5.350$ | 1.60545 | 38.0 |
| Air |  | $d_6=6.640$ |  |  |
| 44 | $r_7=+21.358$<br>$r_8=-10.000$ | $d_7=54.157$ | 1.5726 | 57.8 |
| 45 | $r_8=-10.000$<br>$r_9=-20.060$ | $d_8=1.000$ | 1.62558 | 35.7 |
| Air |  | $d_9=4.076$ |  |  |
| 46 | $r_{10}=+20.060$<br>$r_{11}=+10.000$ | $d_{10}=1.000$ | 1.62558 | 35.7 |
| 47 | $r_{11}=+10.000$<br>$r_{12}=-21.358$ | $d_{11}=54.157$ | 1.5726 | 57.8 |
| Air |  | $d_{12}=6.640$ |  |  |
| 50 | $r_{13}=+21.358$<br>$r_{14}=-10.000$ | $d_{13}=54.157$ | 1.5726 | 57.8 |
| 51 | $r_{14}=-10.000$<br>$r_{15}=-20.060$ | $d_{14}=1.000$ | 1.62558 | 35.7 |
| Air |  | $d_{15}=4.076$ |  |  |
| 52 | $r_{16}=+20.060$<br>$r_{17}=+10.000$ | $d_{16}=1.000$ | 1.62558 | 35.7 |
| 53 | $r_{17}=+10.000$<br>$r_{18}=-21.358$ | $d_{17}=54.157$ | 1.5726 | 57.8 |
| 75 | $r_{19}=+17.647$ | $d_{19}=1.000$ | 1.51889 | 60.42 |
| 76 | $r_{20}=-30.907$ | $d_{20}=1.000$ | 1.51889 | 60.42 |
| 77 |  | $d_{26}=36.83$ | 1.62049 | 36.2 |
| 92 | $r_{21}=+18.499$<br>$r_{22}=+5.432$ | $d_{21}=1.000$ | 1.62274 | 39.6 |
| 93 | $r_{22}=+5.432$<br>$r_{23}=-18.501$ | $d_{22}=3.000$ | 1.51507 | 56.4 |
| Air |  | $d_{23}=9.998$ |  |  |
| 94 | $r_{24}=+79.030$<br>$r_{25}=+7.551$ | $d_{24}=1.000$ | 1.62274 | 39.6 |
| 95 | $r_{25}=+7.551$<br>$r_{26}=-11.794$ | $d_{25}=3.000$ | 1.51690 | 60.6 |

5. An optical system for forming an optical image of an object which optical system comprises a first cylindrical rod-like biconvex lens having a convex entry face and a convex exit face, a second cylindrical rod-like biconvex lens having a convex entry face and a convex exit face, the lenses having a common optical axis and the entry face of the second lens being separated from the exit face of the first lens by a space which contains a gas, the lenses being arranged symmetrically about the said space, the axial thickness of each lens being substantially greater than the diameter of that lens and greater than the axial thickness of the said space, and an endoscope comprising an optical system including an objective lens system coupled with said first and second lenses in a flexible outer sheath that permits bending about the space containing the gas to form a prism effect.

6. A system according to claim 5 comprising at one end of the optical system an internally reflecting prism having an entry face, a reflecting face and an exit face, the exit optical axis of the prism being common with the aforesaid optical axis of the rod lenses, the entry optical axis of the prism being transverse to the exit optical axis of the prism, and the entry face of the prism being concave and symmetrical about the entry optical axis of the prism.

7. A system as defined in claim 5 wherein the plurality of the cylindrical rod-like lenses placed end to end with intervening gas spaces having a surface radius of each convex surface selected together with the axial thickness of the lens and the refractive index to provide small divergence of the rays and form an image through said tube with use of few air glass surfaces.

References Cited by the Examiner

UNITED STATES PATENTS

| | | | |
|---|---|---|---|
| 1,550,197 | 8/1925 | Berry. | |
| 2,423,267 | 7/1947 | Strange | 88—57 |
| 2,519,760 | 8/1950 | Hett | 88—57 |
| 2,538,209 | 1/1951 | Offner | 88—57 |
| 2,699,770 | 1/1955 | Fourestier et al. | 128—6 |
| 2,783,757 | 3/1957 | Scholz | 88—57 X |
| 2,932,294 | 4/1960 | Fourestier et al. | 128—6 |
| 3,060,805 | 10/1962 | Brumley | 88—57 |

FOREIGN PATENTS

| | | |
|---|---|---|
| 10,701 | 1906 | Great Britain. |
| 152,381 | 8/1920 | Great Britain. |

JEWELL H. PEDERSEN, *Primary Examiner.*

EMIL G. ANDERSON, *Examiner.*

J. K. CORBIN, *Assistant Examiner.*